US012584738B1

(12) United States Patent
Li et al.

(10) Patent No.: US 12,584,738 B1
(45) Date of Patent: Mar. 24, 2026

(54) LASER MEASUREMENT TOOL

(71) Applicant: ZHUHAI LEVELSURE TECHNOLOGY CO., LTD., Zhuhai (CN)

(72) Inventors: Xiaojuan Li, Zhuhai (CN); Xiaofang Zhou, Zhuhai (CN)

(73) Assignee: ZHUHAI LEVELSURE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/236,984

(22) Filed: Jun. 13, 2025

(30) Foreign Application Priority Data

May 22, 2025 (CN) .......................... 202521022579.1

(51) Int. Cl.
G01C 15/00 (2006.01)
G01C 3/02 (2006.01)
G01D 5/14 (2006.01)

(52) U.S. Cl.
CPC ............. G01C 15/004 (2013.01); G01C 3/02 (2013.01); G01D 5/145 (2013.01)

(58) Field of Classification Search
CPC ......... G01C 15/004; G01C 3/02; G01D 5/145
See application file for complete search history.

(56) References Cited

U.S. PATENT DOCUMENTS

| | | | | |
|---|---|---|---|---|
| 5,182,863 | A * | 2/1993 | Rando .................... | G01B 11/26 |
| | | | | 33/290 |
| 5,864,404 | A * | 1/1999 | Amorosi ................ | G01B 11/00 |
| | | | | 356/627 |
| 5,983,510 | A * | 11/1999 | Wu ....................... | G01C 15/004 |
| | | | | 33/DIG. 1 |
| 6,373,579 | B1 * | 4/2002 | Ober .................... | G01B 11/002 |
| | | | | 356/309 |
| 7,086,162 | B2 * | 8/2006 | Tyroler ................. | G01B 11/14 |
| | | | | 33/1 G |
| 7,121,010 | B2 * | 10/2006 | Marshall .............. | G01C 15/004 |
| | | | | 33/290 |
| 7,254,899 | B2 * | 8/2007 | Marocco .............. | G01C 15/002 |
| | | | | 33/561.1 |
| 7,992,310 | B2 * | 8/2011 | Litvin .................. | G01C 15/004 |
| | | | | 33/286 |
| 10,766,121 | B2 * | 9/2020 | DeArmond ............. | B25B 5/082 |
| 11,435,181 | B2 * | 9/2022 | Khan ...................... | H01S 3/025 |
| 12,140,429 | B2 * | 11/2024 | Draeger ................ | G01C 15/12 |
| 2007/0101593 | A1 * | 5/2007 | Jang ........................ | G01C 3/06 |
| | | | | 33/286 |

(Continued)

*Primary Examiner* — Kristina M Deherrera
*Assistant Examiner* — Tania Courson
(74) *Attorney, Agent, or Firm* — Birchwood IP

(57) ABSTRACT
The present disclosure relates to a laser measurement tool including a first component and a second component, where one of the first component and the second component is a laser line projector and the other is a laser distance meter; the second component is selectively mountable on at least two different mounting surfaces of the first component, and laser projection orientations of the second component mounted on different mounting surfaces are different from each other. The present disclosure achieves multi-directional installation and functional coordination, being applicable to building construction, interior decoration, and equipment installation scenarios.

19 Claims, 10 Drawing Sheets

(56)　　　　　　References Cited

U.S. PATENT DOCUMENTS

| | | | |
|---|---|---|---|
| 2007/0107249 A1* | 5/2007 | Marocco ................ | G01B 3/563 |
| | | | 33/760 |
| 2008/0094606 A1* | 4/2008 | Schwarz ................ | G01C 15/00 |
| | | | 356/4.01 |
| 2010/0243833 A1* | 9/2010 | Kane, Jr. .............. | G01C 15/004 |
| | | | 248/206.5 |
| 2014/0182147 A1* | 7/2014 | Munroe ................. | H03F 3/087 |
| | | | 340/568.1 |
| 2016/0202056 A1* | 7/2016 | Senger ..................... | G01C 3/02 |
| | | | 356/3 |
| 2023/0221117 A1* | 7/2023 | Ran ........................ | F16M 11/18 |
| | | | 33/290 |

* cited by examiner

LASER MEASUREMENT TOOL

CROSS REFERENCE TO RELATED APPLICATIONS

The present disclosure claims the priority of Chinese Patent Application No. 2025210225791 filed on May 22, 2025 before CNIPA. All the above are hereby incorporated by reference in their entirety.

TECHNICAL FIELD

The present disclosure relates to the technical field of measurement tools, and particularly to a laser measurement tool.

BACKGROUND

In fields such as building construction, interior decoration, and engineering surveying, laser distance meters and laser line projectors serve as two core tools, respectively used for distance measurement and laser reference line projection. However, in prior art, these two devices are typically used as independent equipment, exhibiting the following deficiencies: Firstly, functional separation and cumbersome operation: Users need to carry both the distance meter and line projector separately, requiring multiple positioning operations during measurement, resulting in low efficiency and susceptibility to human-induced errors. Secondly, insufficient flexibility of combined tools: Existing combined tools predominantly adopt a single installation orientation (e.g., horizontal or vertical combination only), failing to adapt to complex scenario requirements (e.g., simultaneous measurement of horizontal spacing and vertical height).

SUMMARY

The present disclosure aims to provide a laser measurement tool to solve the technical problems of cumbersome operation and insufficient flexibility of measurement tools in the prior art.

To solve the above technical problems, the present disclosure adopts the following technical solution:

As a first aspect, provided in the present disclosure is a laser measurement tool, including a first component and a second component, in which one of the first component and the second component is a laser line projector and the other is a laser distance meter; the second component is selectively mountable on at least two different mounting surfaces of the first component, and laser projection orientations of the second component mounted on two different mounting surfaces of the first component are different from each other.

As a second aspect, provided in the present disclosure is further a laser measurement tool, including a first component and a second component, in which one of the first component and the second component is a laser line projector and the other is a laser distance meter; the second component is selectively and detachably mountable on a first mounting surface and a second mounting surface of the first component, where a laser projection direction of the second component mounted on the first mounting surface is parallel to a laser projection direction of the first component, and a laser projection direction of the second component mounted on the second mounting surface is perpendicular to the laser projection direction of the first component. The second component has a built-in signal collector and a main control chip, the signal collector collects a physical parameter of the second component mounted on the first mounting surface or the second mounting surface of the first component, and the main control chip obtains the physical parameter and compares original data with a preset threshold library to determine a type of the mounting surface, the main control chip triggering the first component and/or the second component to automatically switch a measurement mode or a line projection mode according to the type of the mounting surface.

In view of the technical solutions mentioned above, the embodiments of the present disclosure provide at least the following advantages and positive effects.

The laser measurement tool of the embodiments of the present disclosure overcomes limitations of functional separation in conventional tools and achieves high-level coordination between measurement and line projection functions. Through combining a laser line projector and a laser distance meter on two different mounting surfaces, measurement application scenarios are expanded. This solution further ensures consistency between a measurement reference and a projection reference through a predetermined relationship between laser directions on two different mounting surfaces, avoiding errors caused by manual secondary positioning. Measurement accuracy is effectively enhanced, particularly for high-precision construction scenarios.

BRIEF DESCRIPTION OF THE DRAWINGS

In order to illustrate the technical solutions of the embodiments of the present disclosure or of the prior art more clearly, the following drawings are briefly described as required in the context of the embodiments or the prior art. Obviously, the following drawings illustrate only some of the embodiments of the present disclosure. Other relevant drawings may be obtained on the basis of the shown structures of these drawings without any creative effort by those skilled in the art.

DETAILED DESCRIPTION

Typical embodiments reflecting features and advantages of the present disclosure will be described in detail in the following description. It should be understood that the present disclosure may admit to various modifications in different embodiments without departing from the scope of the present disclosure. The descriptions and drawings therein are substantially illustrative in nature rather than restrictive of the present disclosure.

Furthermore, the related terms "first", and "second" are used for descriptive purposes only and are not to be understood as indicating or implying relative importance or implicitly specifying the number of technical features indicated. Thus, features defined as "first" or "second" may explicitly or implicitly include one or more of such features. In the description of the present application, the term "a plurality of" means two or more unless otherwise expressly specified.

In the description of the present application, it should be noted that terms such as "installed," "provided," and "connected" should be broadly understood unless otherwise expressly defined and limited. For example, a connection may be a fixed connection, a detachable connection, or an integral connection; may be a mechanical connection or an electrical connection; may be a direct connection or an indirect connection through an intermediate medium; and may be communication between interiors of two components. Those of ordinary skill in the art may understand the specific meanings of the above terms in the present disclosure based on practical contexts.

Figure 1:
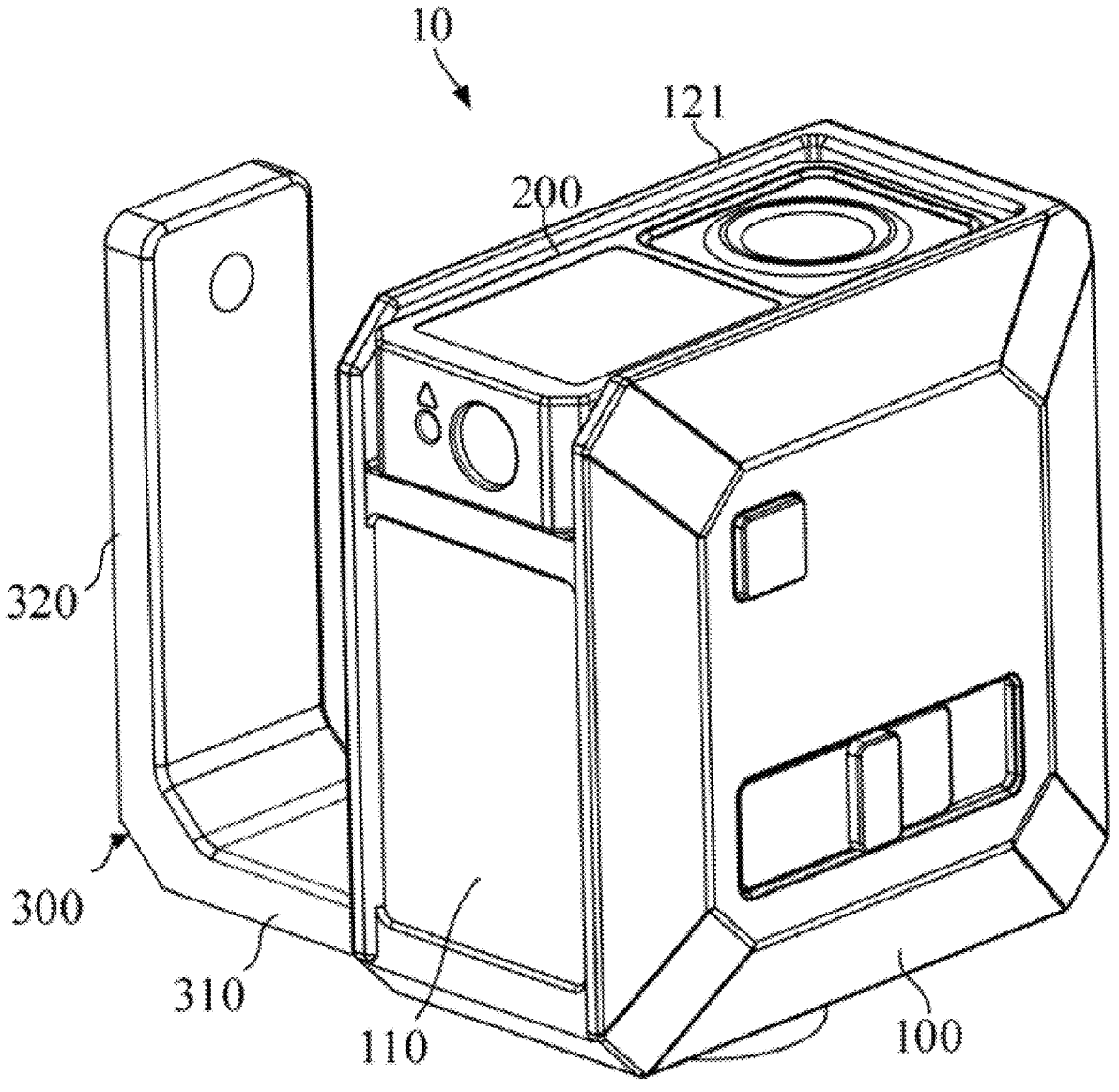
FIG. 1 is a schematic structural view of a laser measurement tool according to an embodiment of the present disclosure.

Referring to FIG. 1, the present disclosure provides a laser measurement tool 10 aimed to solve the problems in prior art including functional separation between laser distance meters and laser line projectors, cumbersome operation, poor portability, and low measurement accuracy. Through innovative three-surface structural design, bidirectional installation capability, and enforced association (parallel or vertical), this tool achieves high-level coordination between measurement and line projection functions, thereby significantly improving operational efficiency and accuracy.

Figure 2:
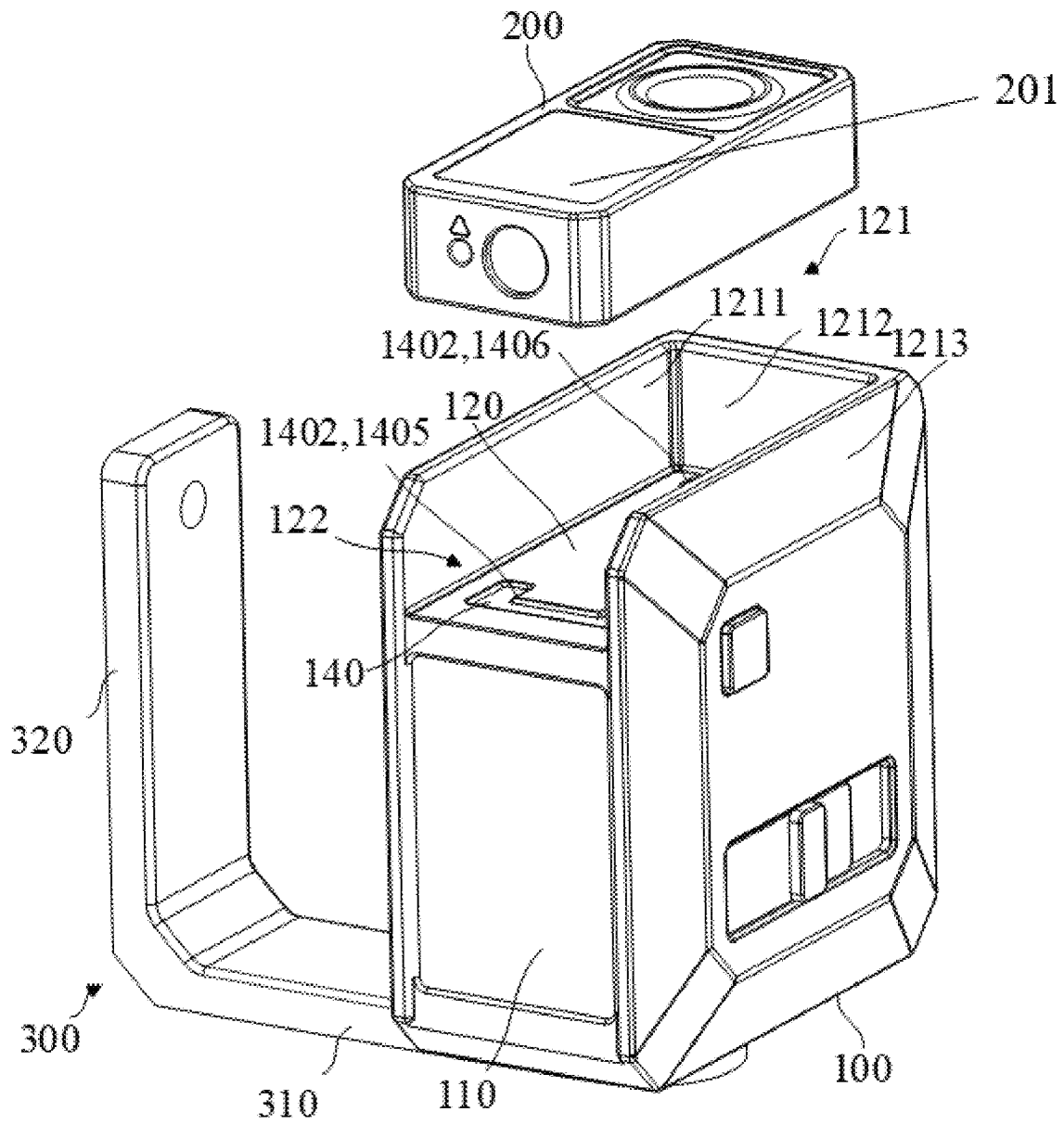
FIG. 2 is a schematic partial exploded view of the laser measurement tool shown in FIG. 1 from one perspective.
Figure 3:
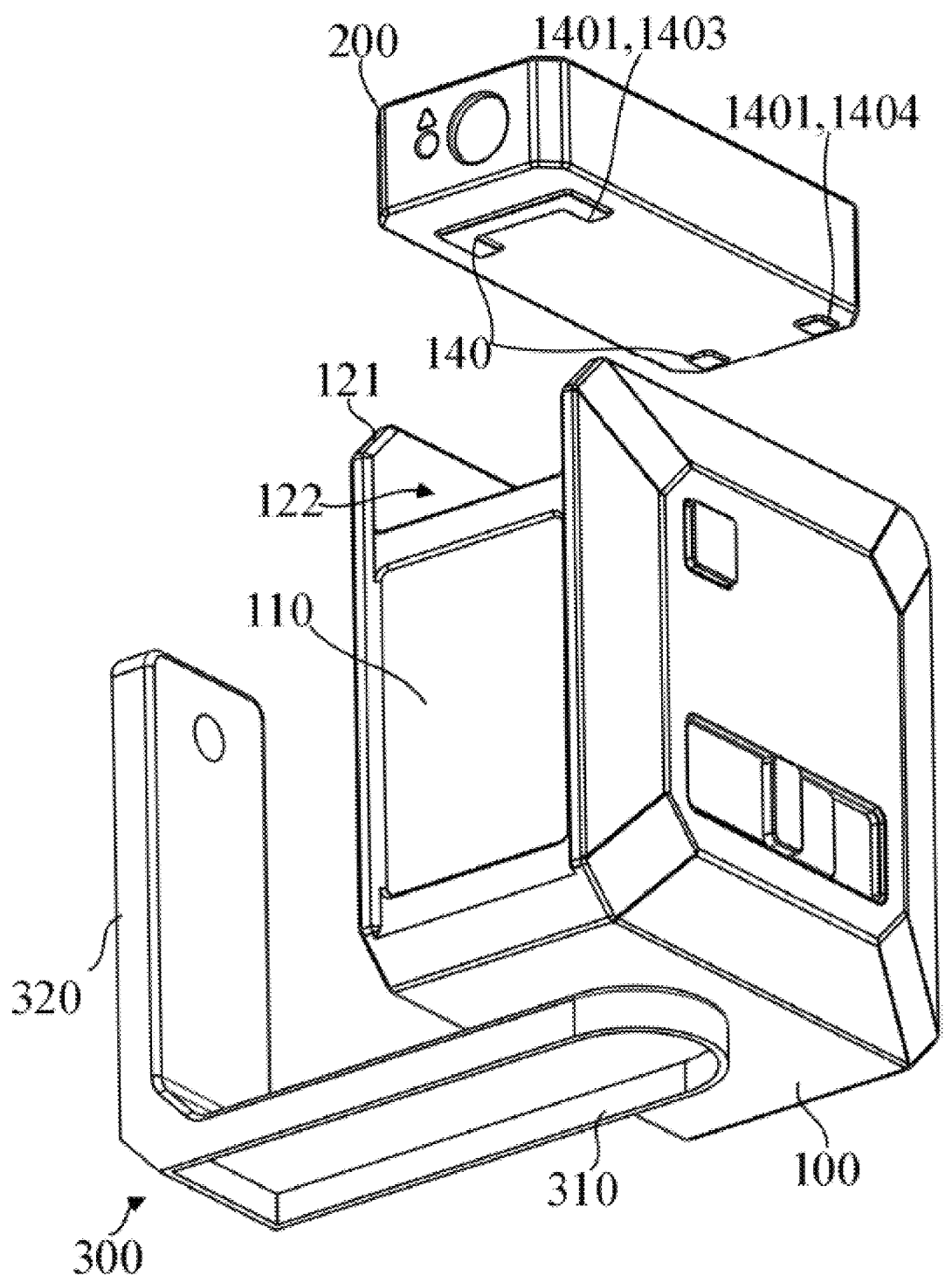
FIG. 3 is a schematic structural view of the laser measurement tool shown in FIG. 2 from another perspective.
Figure 4:
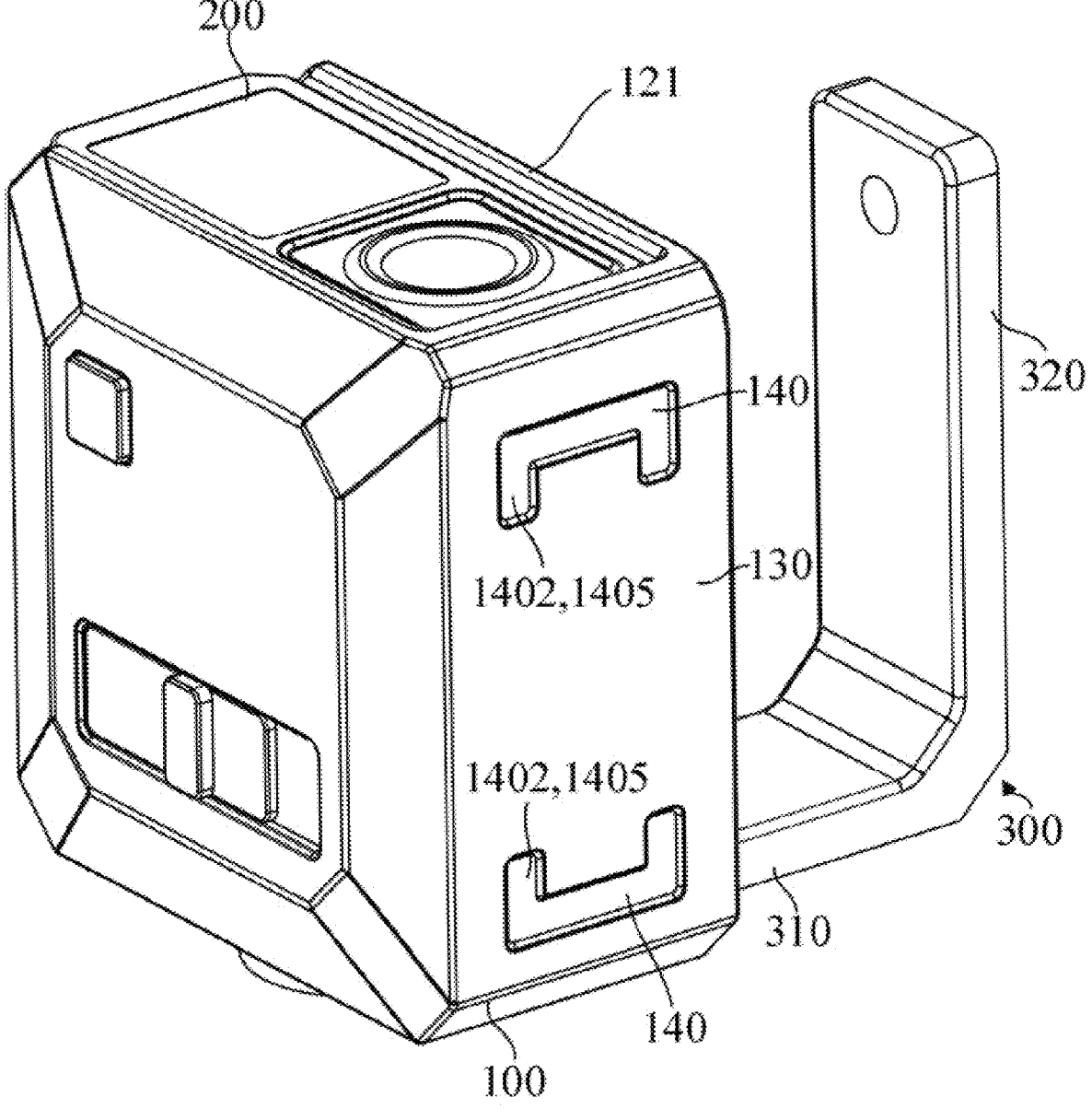
FIG. 4 is a schematic structural view of the laser measurement tool shown in FIG. 1 from another perspective.

Referring to FIGS. 2-4, the laser measurement tool 10 includes a first component 100 and a second component 200, where one of the first component 100 and the second component 200 is a laser line projector and the other is a laser distance meter. The second component 200 is selectively mountable on at least two different mounting surfaces of the first component 100, and laser projection orientations of the second component 200 mounted on two different mounting surfaces of the first component 100 are different from each other. In other words, there may exist a plurality of different mounting surfaces, among which at least two different mounting surfaces cause the laser projection orientations of the second component 200 mounted on these two mounting surfaces of the first component 100 to be different. Through combining the laser line projector and the laser distance meter on two different mounting surfaces, measurement application scenarios are expanded. Further, measurement accuracy is effectively enhanced by ensuring consistency between a measurement reference and a projection reference through a predetermined relationship between laser directions on two different mounting surfaces, thereby avoiding errors caused by manual secondary positioning, particularly for high-precision construction scenarios.

The following embodiments emphasize that laser projection orientations of the second component 200 mounted on two different mounting surfaces are mutually perpendicular. On one mounting surface, a laser projection direction of the second component 200 is parallel to a laser projection direction of the first component 100, while on another mounting surface, the laser projection direction of the second component 200 is perpendicular to the laser projection direction of the first component 100. However, it should be understood that in other embodiments, the laser projection directions of the second component 200 on different mounting surfaces may present at a non-perpendicular angular state. In such cases, a relative positional relationship between the laser projection direction of the second component 200 on any mounting surface and the laser projection direction of the first component 100 is not limited to parallel or perpendicular, and may be customized at an angle as required in practical situations.

Figure 5:
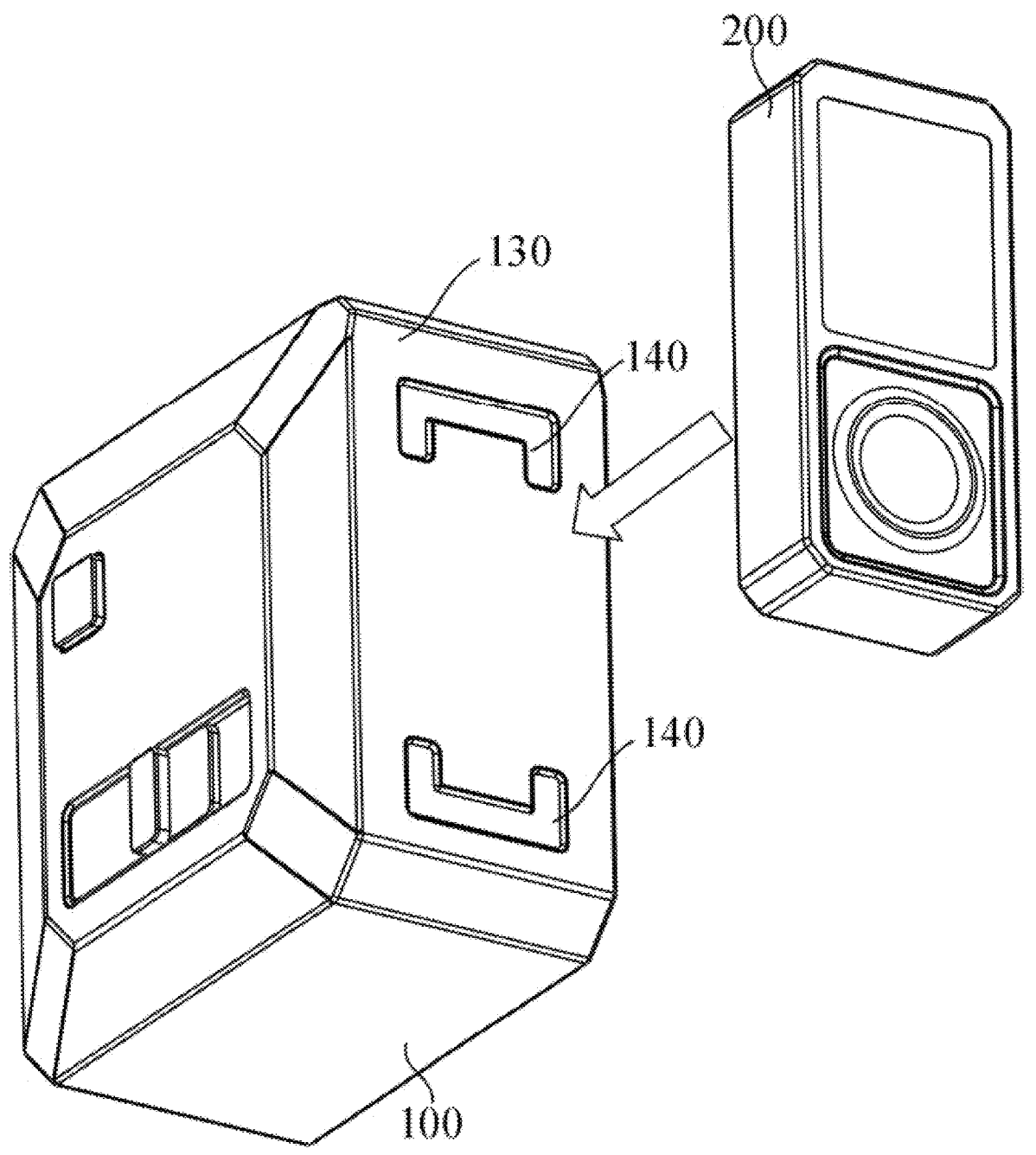
FIG. 5 is a schematic view showing the second component mounted on the second mounting surface facing upward according to an embodiment of the present disclosure.
Figure 6:
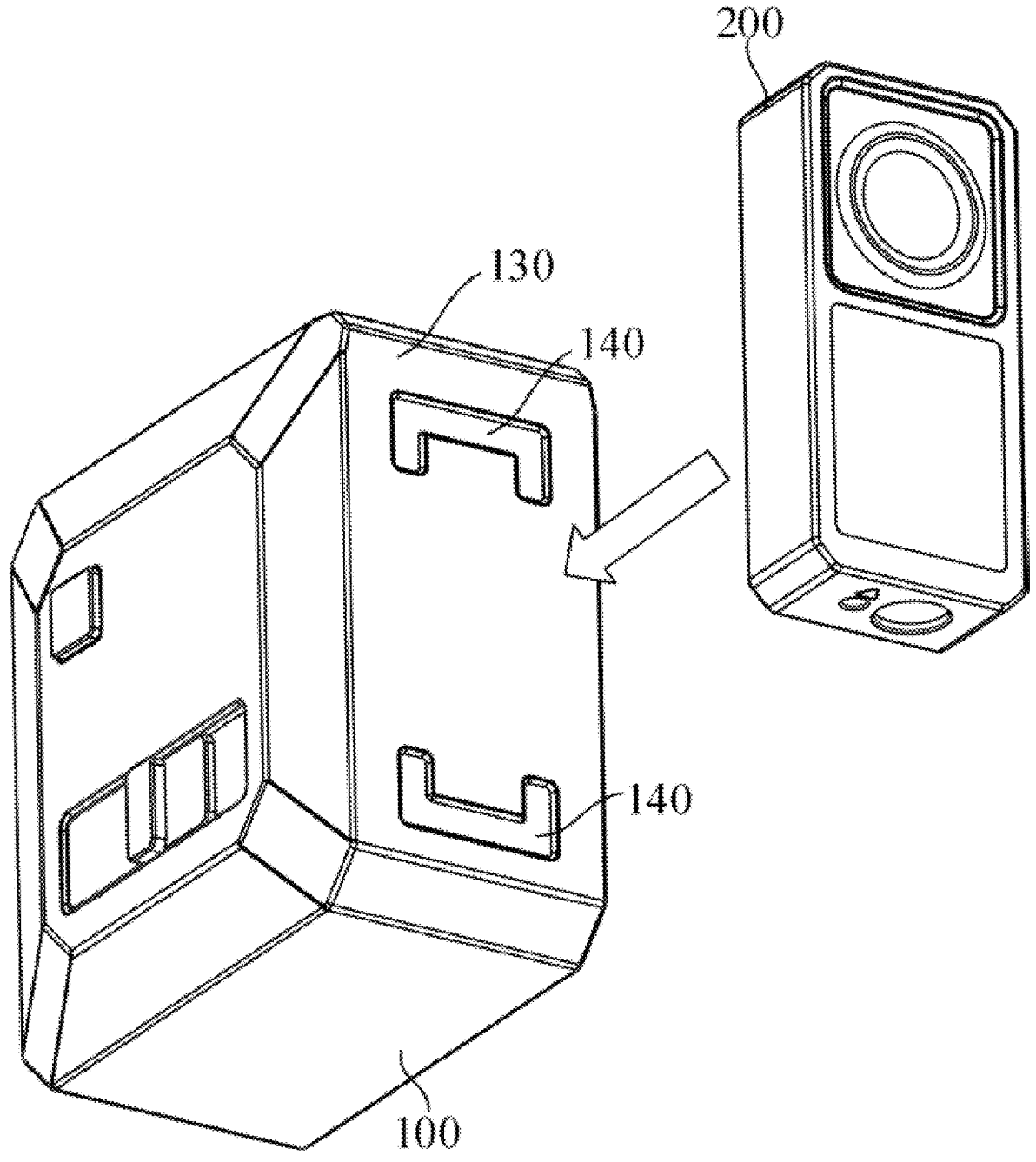
FIG. 6 is a schematic view showing the second component mounted on the second mounting surface facing downward according to an embodiment of the present disclosure.
Figure 7:
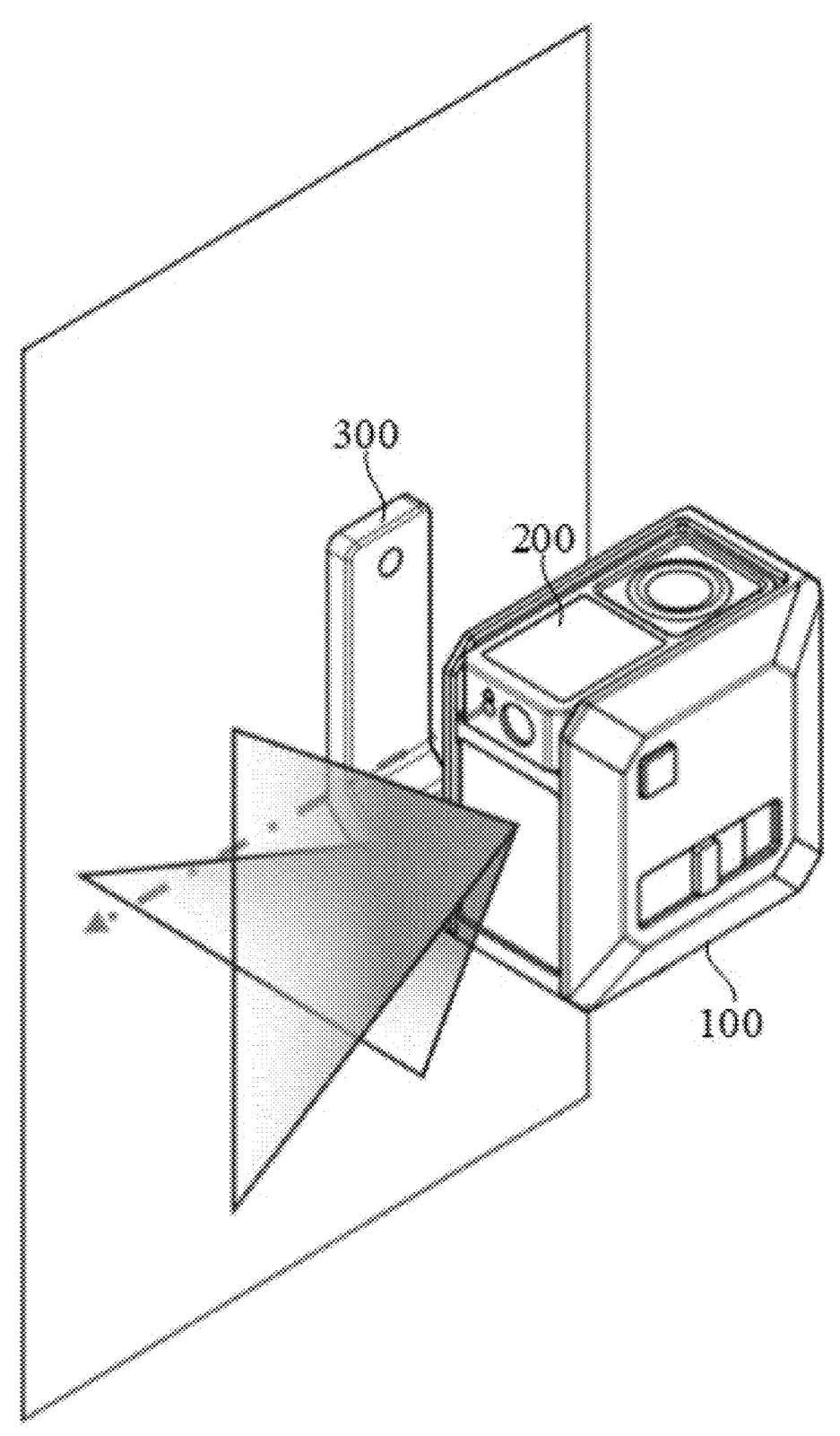
FIG. 7 is a schematic view illustrating horizontal distance measurement in a parallel state of a laser measurement tool according to an embodiment.
Figure 8:
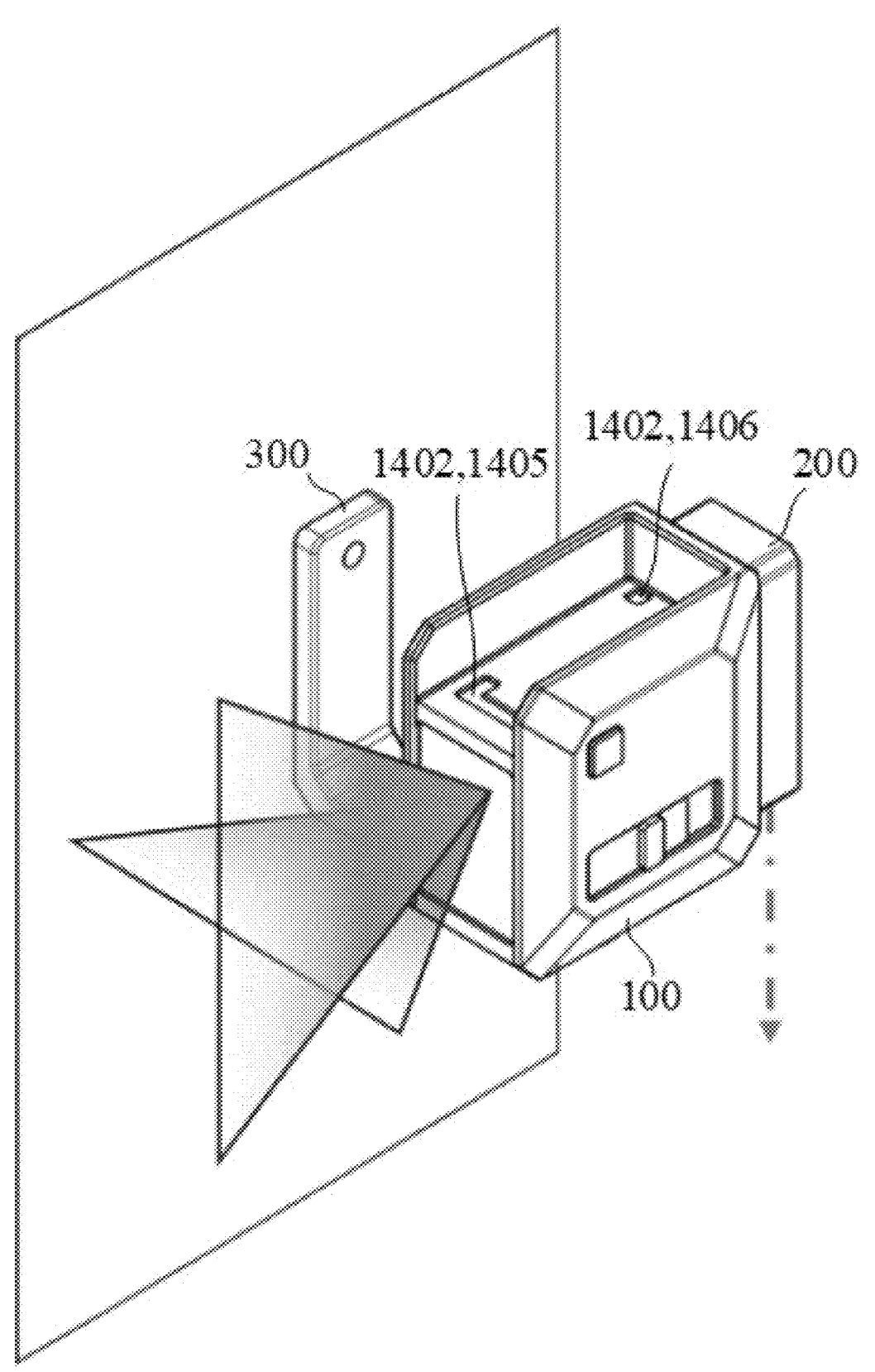
FIG. 8 is a schematic view illustrating downward height measurement in a vertical state of a laser measurement tool according to an embodiment.
Figure 9:
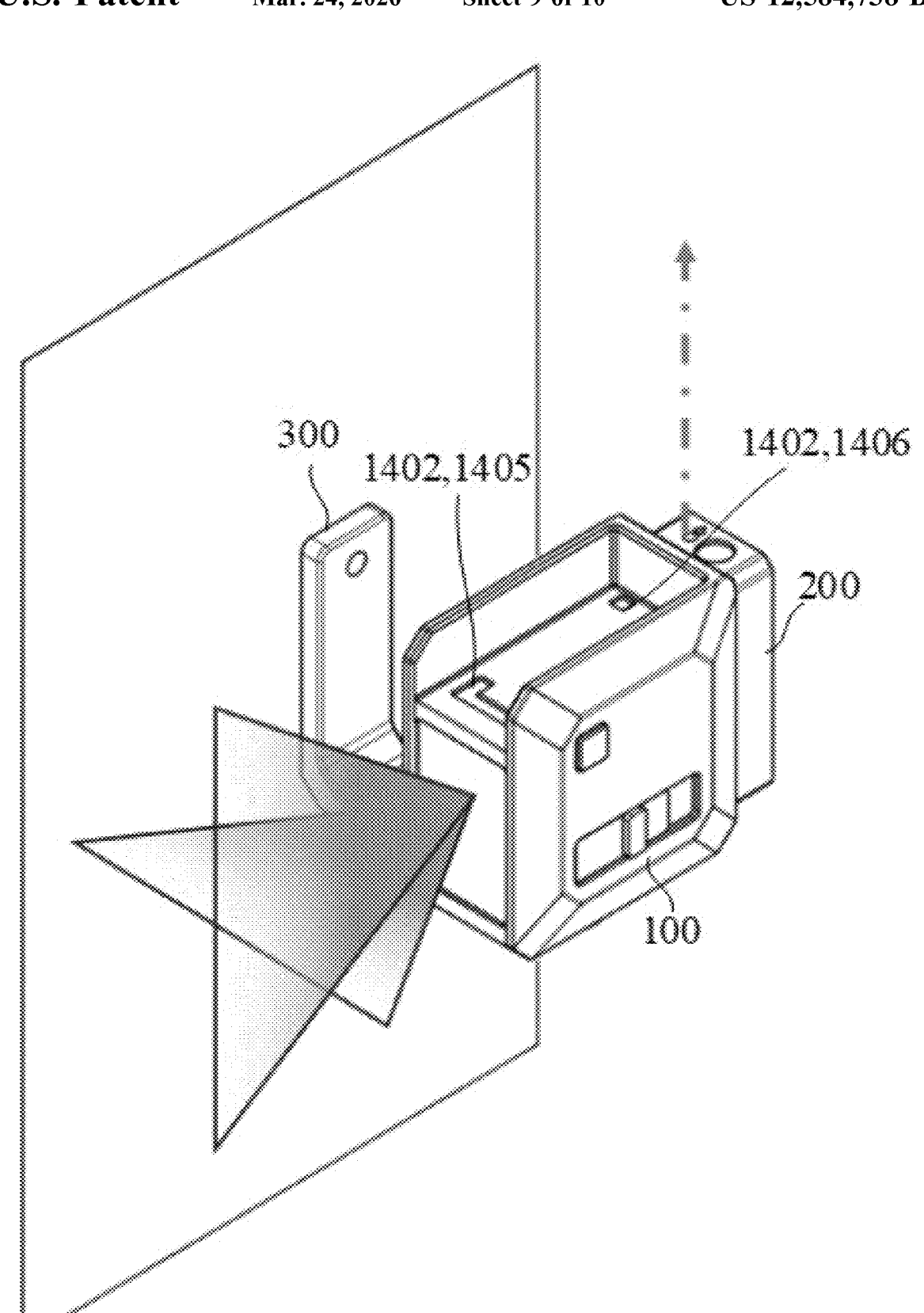
FIG. 9 is a schematic view illustrating upward height measurement in a vertical state of a laser measurement tool according to an embodiment.

The first component 100 includes a first surface 110, a first mounting surface 120, and a second mounting surface 130 located at different orientations. The first surface 110 serves as a laser emission surface. The first surface 110 projects line-projection laser of the first component 100 when the first component 100 is the laser line projector. The first surface 110 projects distance-measurement laser of the first component 100 when the first component 100 is the laser distance meter. The first mounting surface 120 and the second mounting surface 130 are configured to detachably mount the second component 200. Referring to FIGS. 1 and 7, when the second component 200 is first mounting on the first mounting surface 120, a laser projection direction of the second component 200 is parallel to a laser projection direction of the first component 100, and laser projection orientations of both the first and second components are identical. Referring to FIGS. 5 and 6, when the second component 200 is mounted on the second mounting surface 130, a laser projection direction of the second component 200 is perpendicular to a laser projection direction of the first component 100. The second component 200 is selectively mountable on the second mounting surface 130 in at least two installation orientations that form an angle with each other. For example, at least two installation orientations that form an angle with each other include a first orientation and a second orientation that form an angle of 180 degrees with each other. In this embodiment, the first orientation can be understood as an upward-facing direction shown in FIGS. 5 and 9, and the second orientation can be understood as a downward-facing direction shown in FIGS. 6 and 8. The second component 200 is optionally installable facing upward (FIGS. 5 and 9) or facing downward (FIGS. 6 and 8), enabling the laser projection orientation of the second component 200 to be selectively set facing upward or downward. Certainly, in other embodiments, the first orientation and the second orientation may form arbitrary angles other than 180 degrees. Additionally, FIGS. 7-9 illustrate the first component 100 being a laser line projector, where a laser emission surface of the laser line projector projects cross-shaped laser beams to form a cross-shaped positioning mark on a target wall surface. It should be understood that in other embodiments, a mounting orientation of the second component 200 on the second mounting surface 130 may be set to be fixed. In this case, the installation orientation of the second component 200 on the second mounting surface 130 does not exhibit the aforementioned two different orientations, and only one orientation may be retained.

In an embodiment where a laser line projector serves as the main body, the first component 100 is the laser line projector, and a first surface 110 projects a horizontal or vertical reference line. The first mounting surface 120 and the second mounting surface 130 are configured to fixedly mount the distance meter. The second mounting surface 130 supports vertical installation and directional adjustment of the distance meter. For example, in interior decoration scenarios: when the distance meter is parallel-mounted on the first mounting surface 120, it enables rapid measurement of wall spacing; when vertically mounted on the a second mounting surface 130 in downward orientation, it achieves precise measurement of floor-to-ceiling height, which is particularly suitable for elevated or complex terrain operations.

In an embodiment with the distance meter as the main body: the first component 100 is the laser distance meter, its first mounting surface 120 and second mounting surface 130 fixedly mount the line projector. In field surveying scenarios: when the line projector is parallel-installed on the first mounting surface 120 of the distance meter, it assists in generating horizontal reference lines; when vertically installed, the line projector is stored on the second mounting surface 130 to prevent transportation damage. This design reduces tool volume by 40%, being particularly suitable for elevated or complex terrain operations.

The design of the above solution breaks through the unidirectional combination limitations of conventional tools, achieving flexible multi-dimensional measurement. Referring to FIGS. 7-9, the laser measurement tool 10 provides a parallel installation mode (the first mounting surface 120) for horizontal distance measurement and a vertical installation mode (the second mounting surface 130) for height measurement, and the second mounting surface 130 supports upward/downward installation to cover complex scenarios such as ceilings and floor surfaces, realizing multi-dimensional measurement with a single tool, reducing equipment carrying load, and significantly improving operational efficiency. In extended application scenarios: under vertical installation mode: upward installation of the distance meter enables ceiling height measurement while downward installation facilitates floor reference height measurement; when the line projector is mounted to the distance meter, it assists in generating vertical or horizontal reference lines. This solution ensures consistency between measurement reference and projection reference through enforced laser direction association (parallel or vertical), eliminating errors caused by manual secondary positioning, thereby effectively enhancing measurement accuracy, particularly suitable for high-precision construction scenarios. In summary, through the core design of "three-sided structure+ bidirectional installation", this solution overcomes the limitations of functional separation in conventional tools, achieves high-level coordination between measurement and line projection functions, while significantly improving measurement efficiency, accuracy, and tool applicability through structural innovation and intelligent adaptation, demonstrating substantial practical value.

In one embodiment, at least one mounting surface is provided with a baffle 121, the baffle 121 envelopes the second component 200 for storage and forms a protective structure. At least one side of the baffle 121 forms a lateral channel 122 for allowing a laser from the second component 200 to pass through. For example, referring to FIGS. 1 and 2, FIGS. 1 and 2 only illustrate that the first mounting surface 120 is provided with the baffle 121. However, it should be understood that the second mounting surface 130 may also be provided with an identical baffle 121 structure. FIGS. 1 and 2 illustrate that the baffle 121 is a circumferentially continuously connected structure, and the lateral channel 122 is a light-transmitting gap. In this configuration, ends of the baffle 121 are continuously extended on one side to form the protective structure, and the ends of the baffle 121 are spaced apart on an opposite side to form the light-transmitting gap (one form of the lateral channel 122). It should be understood that in other embodiments, the lateral channel 122 may alternatively be a light-transmitting plate. When the lateral channel 122 is the light-transmitting plate, the baffle 121 may be configured as a circumferentially end-to-end continuously connected structure, where the baffle 121 encloses a larger area of the second component 200, and the risk of the second component 200 being damaged by external factors is further reduced. FIG. 2 illustrates that the lateral channel 122 formed on one side of the baffle 121 and the laser-emitting surface (first surface 110) of the first component 100 are located on the same side. In other embodiments, the baffle 121 may also be provided with a lateral channel 122 on another side opposite the first surface 110. In such cases, the second component 200 may have two installation orientations on the first mounting surface 120. Laser emission directions of the two installation orientations are opposite, each corresponding to one lateral channel 122.

In one embodiment, the baffle 121 is a three-sided vertical baffle as illustrated in the figures (FIG. 2), including a first vertical plate 1211, a second vertical plate 1212, and a third vertical plate 1213 connected sequentially. The first vertical plate 1211, second vertical plate 1212, and third vertical plate 1213 form a substantially U-shaped configuration when connected. It should be understood that in other embodiments, the baffle 121 may assume any other arbitrary shape, to which the present disclosure does not impose any limitation.

In one embodiment, a height of the second component 200 relative to a mounting surface on which the second component 200 is installed is lower than that of the baffle 121 relative to a corresponding mounting surface when the second component 200 is enveloped by the baffle 121. Taking the baffle 121 mounted on the first mounting surface 120 as illustrated in the figures: A height of the second component 200 relative to the first mounting surface 120 is lower than that of the baffle 121 relative to the first mounting surface 120 when the second component 200 is installed on the first mounting surface 120. The above configuration may further ensure that a top portion of the second component 200 is less prone to collision damage. It should be understood that in scenarios where collision damage to the top portion is not considered, the height of the second component 200 relative to a mounting surface on which the second component 200 is installed may also be configured to be not lower than that of the baffle 121 relative to a corresponding mounting surface.

The first component 100 and/or the second component 200 includes a digital display module 201. That is, at least one of the first component 100 and the second component 200 is provided with the digital display module 201. The digital display module 201 is positioned apart from a surface where the first component 100 and the second component 200 are combined and is exposed on the laser measurement tool 10 to allow a user to observe electronic information displayed on the digital display module 201 during operation. Referring to FIGS. 2 and 4, both the first mounting surface 120 and second mounting surface 130 are provided with positioning structures 140. The positioning structures 140 include a protruding strip 1401 or a recessed groove 1402 configured to engage with a corresponding recessed groove 1402 or protruding strip 1401 disposed on the second component 200 for fixation. In this embodiment, both the first mounting surface 120 and the second mounting surface 130 are provided with a recessed groove 1402 for cooperating with a protruding strip 1401 provided correspondingly on the second component 200 for fixation. The recessed groove 1402 provided on the first mounting surface 120 and the protruding strip 1401 provided on the second component 200 are complementary in shape. The size of the recessed groove 1402 provided on the second mounting surface 130 is larger than that of the protruding strip 1401 provided on the second component 200 such that the protruding strip 1401 of the second component 200 may be accommodated within the recessed groove 1402 when the second component 200 is mounted on the second mounting surface 130 in different installation orientations.

The protruding strip 1401 provided correspondingly on the second component 200 includes at least two sub-strips 1403, 1404 of different shapes. A portion of a large-sized sub-strip 1403 is identical in shape and size to a small-sized sub-strip 1404. The recessed groove 1402 provided on the first mounting surface 120 includes at least two sub-grooves 1405, 1406 of different shapes. The two sub-strips 1403, 1404 and the two sub-grooves 1405, 1406 of the first mounting surface 120 are complementary in shape. The recessed groove 1402 provided on the second mounting surface 130 includes two sub-grooves 1405 of the same shape, and the sub-groove 1405 of the second mounting surface 130 is complementary in shape to the large-sized sub-strip 1403 among the two sub-strips 1403, 1404 of the second component 200.

In one embodiment, the second component 200 is positioned on the different mounting surfaces of the first component 100 by magnets. Specifically, both the first mounting surface 120 and second mounting surface 130 are provided with magnetic attraction components. The second component 200 is provided with magnets matching the magnetic attraction components, and the second component 200 is magnetically assisted in mounting on the first mounting surface 120 and second mounting surface 130. The magnetic attraction components may be metal components. When the magnets are installed on the first mounting surface 120 and the second mounting surface 130, automatic alignment through magnetic attraction between the magnets and metal components enables installation to target positions. In another embodiment, the magnetic attraction components may be another type of magnet with opposite polarity to the magnets. During specific usage, the second component 200 may also be used independently by magnetically attaching to metal wall surfaces.

In one embodiment, when the second component 200 is mounted parallel to the first component 100, a laser-emitting surface of the first component 100 and a laser-emitting surface of the second component 200 are parallel. That is, the two laser-emitting surfaces may lie in the same plane or may be spaced parallel surfaces, ensuring optical path alignment. When the second component 200 is mounted perpendicular to the first component 100, the laser-emitting surface of the first component 100 and the laser-emitting surface of the second component 200 are located in mutually perpendicular planes, with laser exit windows positioned orthogonally to prevent beam interference. This design demonstrates remarkable effectiveness in pipeline layout scenarios, where beams from the line projector and distance meter remain mutually non-interfering, thereby significantly improving measurement accuracy.

Figure 10:
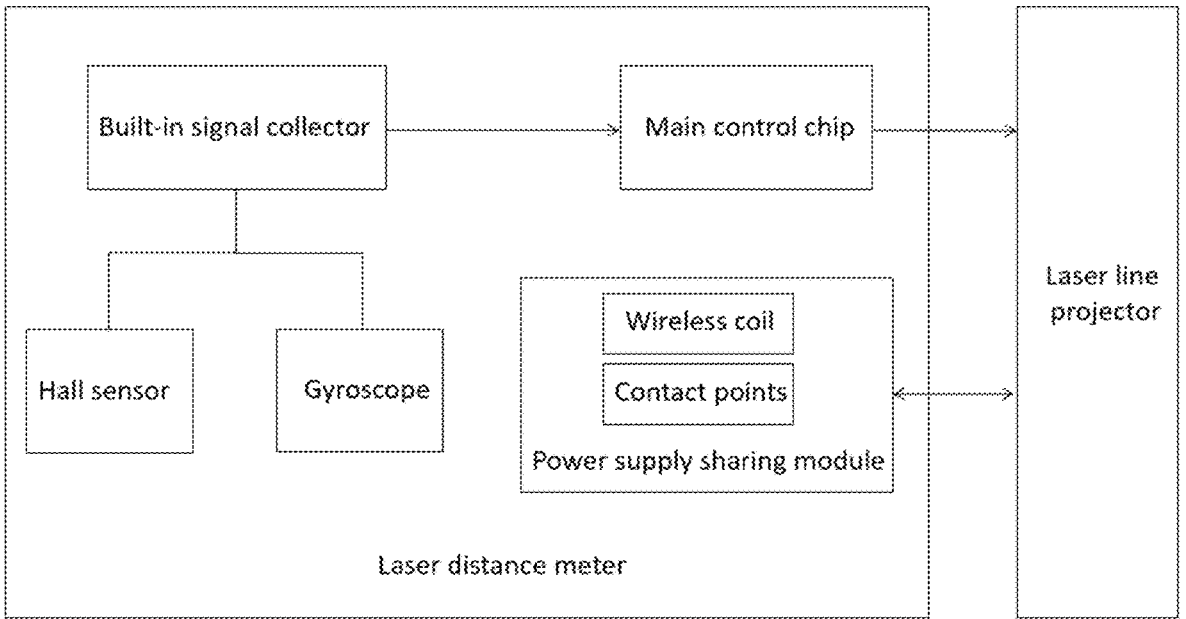
FIG. 10 is a schematic diagram of a laser distance meter according to an embodiment.

In an embodiment, the first component 100 internally integrates a power supply sharing module including at least one of contact points and a wireless coil, configured to supply power to the second component 200 when the second component 200 is mounted to the first component 100 (as shown in FIG. 10). The power supply sharing module implements electrical power transmission from the first component 100 to the second component 200 through two technical pathways: contact-based power supply and wireless charging. When the second component 200 is mounted to the first component 100, physical connection or spatial coupling between them triggers a power supply process, ensuring continuous electrical energy supply to the second component 200 in the combined state, thereby reducing user inconvenience caused by frequent battery replacement or separate charging.

In the contact-based power supply solution: the mounting surface of the first component 100 is provided with metal contacts; corresponding positions on the second component 200 are designed with conductive tabs. When the second component 200 is mounted to the first component 100 through positioning structures 140 and/or magnetic attraction structures, the conductive tabs precisely engage with the metal contacts to form a closed circuit. The contact layout typically adopts a symmetrical design pattern. For example, positive and negative contacts are arranged on both sides of the mounting surface to ensure automatic polarity matching regardless of the installation orientation of the second component 200. To enhance contact reliability, the contact surfaces employ a gold-plating process to reduce resistance and incorporate elastic structures (such as spring-loaded pins) to compensate for contact failures caused by mechanical tolerances or minor misalignments. For example, in construction scenarios where tools experience vibration-induced slight displacements, the elastic contacts maintain stable conductivity to prevent power interruptions.

In the wireless charging solution, the wireless charging solution operates based on the electromagnetic induction principle. The first component 100 internally integrates a transmitter coil while the second component 200 incorporates a built-in receiver coil. When both components are properly installed, the spatial positions of the transmitter coil and receiver coil satisfy electromagnetic coupling conditions. The first component 100 transmits electrical energy to the second component 200 through an alternating magnetic field. The key to this solution lies in the precise alignment design of the coils. The mounting surface of the first component 100 is provided with positioning structures to ensure coaxial alignment between the receiver coil and transmitter coil during installation of the second component 200, thereby maximizing energy transfer efficiency. For example, in interior decoration scenarios when users attach the distance meter to the second mounting surface 130 of the line projector, the coils automatically align. This enables charging efficiency to approach wired charging levels. To accommodate different power requirements, the system supports dynamic tuning. When detecting that the second component 200 is a high-power consumption module (such as a line projector with laser mapping functionality), it automatically increases output power.

Both power supply modes are able to operate independently or collaboratively. In some embodiment, the first component 100 simultaneously integrates both contacts and a wireless coil, allowing users to flexibly select based on usage environments. For example, in humid or dusty outdoor construction sites, wireless charging is prioritized to avoid contact oxidation. In emergency situations requiring rapid charging, switching to contact-based power supply utilizes its higher efficiency. The system incorporates an intelligent switching circuit that automatically selects the optimal power supply mode by detecting interface types of the second component 200 (such as contact impedance or wireless signals), requiring no manual intervention. Furthermore, the power supply sharing module includes multiple protection mechanisms. Over-voltage/over-current protection chips prevent device damage. A foreign object detection function identifies metal debris during wireless charging and cuts off power supply to ensure operational safety. From a user experience perspective, the design of the power supply sharing module significantly enhances tool operability. Users need not carry additional charging cables or remove batteries. Simply mounting the second component 200 to the first component 100 completes charging. For instance, during continuous operations, workers use the distance meter for daytime measurements; nighttime installation onto the line projector achieves full charge by next morning; and this prevents project delays from power depletion, particularly suitable for field surveying scenarios lacking stable power supply.

In one embodiment, the second component 200 has a built-in position sensor including a signal collector. The position sensor is configured to detect whether the second component 200 is installed on the first mounting surface 120 or the second mounting surface 130 of the first component 100, determine a mounting surface type based on the detection, and automatically switch between a measurement mode or a line projection mode according to the mounting surface type. Specifically, the position sensor intelligently identifies installation position and orientation by detecting physical connection status between the second component 200 and first component 100, thereby triggering corresponding functional mode switching. The core principle lies in converting physical installation information into electrical signals through logical determination to achieve automated operations, thereby reducing manual intervention and enhancing tool response speed and operational precision.

When the second component 200 is mounted to the first mounting surface 120 of the first component 100 through positioning structures 140 or magnetic attraction structures, the position sensor first detects magnetic field characteristics or optical markers of the mounting surface. For example, in a magnetic sensor solution, the first mounting surface 120 of the first component 100 is embedded with permanent magnets of specific polarity, while the a second mounting surface 130 employs magnetic arrays with different field strengths. The Hall sensor (a signal collector) inside the second component 200 determines whether the current mounting surface is the first mounting surface 120 or a second mounting surface 130 by measuring magnetic field intensity and direction. If the magnetic field characteristics of the first mounting surface 120 are detected (such as north pole orientation), the sensor sends signals to the main control chip to trigger "parallel measurement mode". In this mode the distance meter automatically calibrates for horizontal measurement or the line projector adjusts to horizontal laser projection. If the magnetic field characteristics of the second mounting surface 130 are detected (such as south pole orientation with magnetic field gradient variation), it switches to "vertical measurement mode" where the distance meter activates height measurement algorithms or the line projector switches to vertical laser line projection.

Regarding determination of an installation orientation (such as the second mounting surface 130 facing upward or downward), the sensor may further include a gyroscope (a signal collector), and the sensor further incorporates data from an accelerometer or the gyroscope. When the second component 200 is mounted on the second mounting surface 130, the built-in six-axis gyroscope monitors the tool's spatial attitude in real-time. If the tool is in upright position (line projector reference surface horizontally facing forward), the gyroscope detects positive Z-axis gravitational component, determining "downward installation" and activating downward vertical measurement mode suitable for floor-to-wall height measurement. If the tool is inverted (reference surface horizontally facing backward) with negative Z-axis gravitational component, it determines "upward installation" and initiates upward vertical measurement mode for ceiling height or elevated pipeline positioning. This multi-sensor fusion design ensures both reliable mounting surface identification and precise orientation determination.

In practical applications, the mode switching process provides clear user feedback. For example, in construction site scenarios when workers mount the distance meter to first mounting surface 120 of the line projector, the position sensor identifies parallel installation status. The main control chip automatically deactivates vertical laser line projection of the line projector while retaining horizontal line projection. Simultaneously, the distance meter screen displays a "horizontal mode" indicator and activates continuous distance measurement function. If rotating the distance meter 180 degrees to mount on the second mounting surface 130 in upward orientation, the sensor determines "vertical upward mode" through magnetic field and gyroscope data. The line projector immediately switches to vertical laser line projection. The distance meter screen displays a "verticalf" symbol and initiates single-precision height measurement function. This seamless switching allows workers to maintain operational continuity in complex environments without stopping to adjust equipment.

Technically, the sensor signal processing flow includes three critical phases: signal acquisition, logical determination, and command execution. During signal acquisition phase, hardware components including Hall sensors and gyroscopes capture physical parameters of mounting surfaces in real-time (as shown in FIG. 10). In logical determination phase, the main control chip compares raw data with a preset threshold database (e.g., magnetic flux density threshold of the first mounting surface: 50-70 mT; that of the second mounting surface: 30-40 mT). A decision tree algorithm determines current installation status. During command execution phase, the chip sends control commands to laser modules, measurement modules, and display units to complete mode switching. The entire process achieves response time under 200 milliseconds, making the delay virtually imperceptible to users.

The advantages of this design are particularly prominent in differentiated application scenarios. For example, during indoor ceiling installation operations, workers first mount the distance meter to the first mounting surface 120 to complete wall spacing measurement, and then the distance meter is removed and remounted to the second mounting surface 130 in upward orientation. The position sensor immediately detects state changes. The line projector automatically deactivates horizontal lines and projects vertical laser lines onto ceilings while the distance meter switches to upward measurement mode to directly read ceiling installation height values. This entire process eliminates manual mode-switch button presses or reference manual parameter adjustments achieving autonomous functional adaptation. Workers are able to focus on construction quality rather than equipment operations.

Referring to FIG. 1, the laser measurement tool 10 further includes a support stand 300 having a supporting end 310 and a fixing end 320. The supporting end 310 is rotatably connected to a bottom portion of the first component 100, and the fixing end 320 is installed to a support surface. The support surface may be a wall surface, a tabletop, a vertical surface, or other external surfaces. The first component 100 is rotatable relative to the support bracket 300 enabling flexible laser projection angle adjustments during actual measurement operations. FIG. 1 illustrates the support bracket 300 as an L-shaped bracket fixed to walls via threaded connectors. In other embodiments the shape of the support bracket 300 is not limited and may include other configurations. Mounting methods may alternatively employ adhesive bonding or dovetail clamping mechanisms. The support bracket 300 is detachable from the first component 100. When not required, the first component 100 is able to be placed directly on supporting surfaces for use.

Although the present disclosure has been described with reference to several typical embodiments, it should be understood that the terminology used is illustrative and exemplary rather than restrictive. Since the present disclosure can be implemented in various forms without departing from its spirit or essence, it should be understood that the above-described embodiments are not limited by any foregoing details but should be broadly interpreted within the spirit and scope defined by the appended claims. Therefore, all changes and modifications falling within the scope of the claims or equivalents thereof should be covered by the appended claims.

Reference numerals are as follows:

10: laser measurement tool; 100: first component; 110: first surface; 120: first mounting surface; 121: baffle; 1211: first vertical plate; 1212: second vertical plate; 1213: third vertical plate; 122: lateral channel; 130: second mounting surface; 140: positioning structure; 1401: protruding strip; 1402: recessed groove; 1403, 1404: sub-strip; 1405, 1406: sub-groove; 200: second component; 201: digital display module; 300: support stand; 310: supporting end; 320: fixing end.

What is claimed is:

1. A laser measurement tool, comprising: a first component and a second component, wherein the first component is a laser line projector and the second component is a laser distance meter; the laser distance meter is selectively mountable on at least two different mounting surfaces of the laser line projector, and laser projection orientations of the laser distance meter mounted on two different mounting surfaces of the laser line projector are different from each other;

wherein the laser line projector comprises a first mounting surface and a second mounting surface for detachably mounting the laser distance meter;

wherein both the first mounting surface and the second mounting surface are provided with a recessed groove for cooperating with a protruding strip provided correspondingly on the laser distance meter for fixation;

the recessed groove provided on the first mounting surface and the protruding strip provided on the laser distance meter are complementary in shape; a size of the recessed groove provided on the second mounting surface is larger than that of the protruding strip provided on the laser distance meter, so as to allow the protruding strip of the laser distance meter to be accommodated within the recessed groove when the laser distance meter is mounted on the second mounting surface in different installation orientations.

2. The laser measurement tool according to claim 1, wherein the protruding strip provided correspondingly on the laser distance meter comprises at least two sub-strips of different shapes, and a portion of a large-sized sub-strip has a shape and size identical to a small-sized sub-strip;

the recessed groove provided on the first mounting surface includes at least two sub-grooves of different shapes, the two sub-strips and the two sub-grooves of the first mounting surface are complementary in shape;

the recessed groove provided on the second mounting surface includes two sub-grooves of the same shape, and the sub-groove of the second mounting surface is complementary in shape to the large-sized sub-strip among the two sub-strips of the laser distance meter.

3. The laser measurement tool according to claim 1, wherein the laser distance meter is positioned on the different mounting surfaces of the laser line projector by magnets.

4. The laser measurement tool according to claim 1, wherein the laser line projector internally integrates a power supply sharing module, the power supply sharing module comprising at least one of contact points and a wireless coil, configured to supply power to the laser distance meter when the laser distance meter is mounted to the laser line projector.

5. The laser measurement tool according to claim 1, wherein the laser line projector and/or the laser distance meter comprises a digital display module, the digital display module is positioned apart from a surface where the laser line projector and the laser distance meter are combined, and the digital display module is exposed on the laser measurement tool.

6. The laser measurement tool according to claim 1, further comprising a support stand having a supporting end and a fixing end, wherein the supporting end is rotatably connected to the laser line projector, and the fixing end is configured for installation to an external support surface.

7. The laser measurement tool according to claim 1, wherein when the laser distance meter is mounted on the first mounting surface, a laser projection direction of the laser distance meter is parallel to a laser projection direction of the laser line projector, and laser projection orientations of both the laser line projector and laser distance meter are identical; and/or, when the laser distance meter is mounted on the second mounting surface, the laser projection direction of the laser distance meter is perpendicular to the laser projection direction of the laser line projector.

8. The laser measurement tool according to claim 7, wherein when the laser distance meter is mounted parallel to the laser line projector, a laser-emitting surface of the laser line projector is parallel to a laser-emitting surface of the laser distance meter;

when the laser distance meter is mounted perpendicular to the laser line projector, the laser-emitting surface of the laser line projector and the laser-emitting surface of the laser distance meter are located in planes perpendicular to each other.

9. The laser measurement tool according to claim 7, wherein the laser distance meter is selectively mountable on the second mounting surface in at least two installation orientations that form an angle with each other.

10. The laser measurement tool according to claim 9, wherein the at least two installation orientations that form an angle with each other include a first orientation and a second orientation that form an angle of 180 degrees with each other.

11. The laser measurement tool according to claim 1, wherein at least one of the mounting surfaces is provided with a baffle, the baffle envelopes the laser distance meter for storage and forms a protective structure, at least one side of the baffle forms a lateral channel, and the lateral channel allows a laser from the laser distance meter to pass through.

12. The laser measurement tool according to claim 11, wherein the baffle is a structure that is continuously connected end-to-end circumferentially, the lateral channel is a light-transmitting gap.

13. The laser measurement tool according to claim 11, wherein the lateral channel formed on one side of the baffle is located on a same side as a laser-emitting surface of the laser line projector.

14. The laser measurement tool according to claim 11, wherein ends of the baffle are continuously extended on one side to form the protective structure, and the ends of the baffle are spaced apart on an opposite side to form the lateral channel, the lateral channel being a light-transmitting gap.

15. The laser measurement tool according to claim 14, wherein the baffle is a three-sided vertical baffle, and the baffle comprises a first vertical plate, a second vertical plate, and a third vertical plate that are sequentially connected.

16. The laser measurement tool according to claim 11, wherein a height of the laser distance meter relative to a mounting surface on which the laser distance meter is installed is lower than that of the baffle relative to a corresponding mounting surface when the laser distance meter is enveloped by the baffle.

17. A laser measurement tool, comprising a first component and a second component, wherein the first component is a laser line projector and the second component is a laser distance meter; the laser distance meter is selectively and detachably mountable on a first mounting surface and a second mounting surface of the laser line projector, wherein a laser projection direction of the laser distance meter mounted on the first mounting surface is parallel to a laser projection direction of the laser line projector, and a laser projection direction of the laser distance meter mounted on the second mounting surface is perpendicular to the laser projection direction of the laser line projector;

wherein the laser distance meter has a built-in signal collector and a main control chip, the signal collector collects a physical parameter of the laser distance meter mounted on the first mounting surface or the second mounting surface of the laser line projector, and the main control chip obtains the physical parameter and compares original data with a preset threshold library to determine a type of the mounting surface, the main control chip triggering the laser line projector and/or the laser distance meter to automatically switch a measurement mode or a line projection mode according to the type of the mounting surface.

18. The laser measurement tool according to claim 17, wherein the signal collector comprises a Hall sensor, the first mounting surface and the second mounting surface are embedded with permanent magnets that are different in magnetic field strength and/or polarity, the Hall sensor measures a current magnetic field strength and/or magnetic field direction of the mounting surface on which it is installed, and the main control chip determines the current mounting surface based on the magnetic field strength and/or magnetic field direction of the current mounting surface.

19. The laser measurement tool according to claim 18, wherein the laser distance meter is selectively mountable on the second mounting surface in two installation orientations that form an angle with each other;

the signal collector further comprises a gyroscope, the gyroscope measures a gravitational force component of the current mounting surface, and the main control chip determines the current mounting surface based on the gravitational force component of the current mounting surface.

* * * * *